United States Patent [19]
Mertens et al.

[11] Patent Number: 4,806,843
[45] Date of Patent: Feb. 21, 1989

[54] D.C. VOLTAGE SUPPLY CIRCUIT

[75] Inventors: Ferdinand Mertens; Fred Hasemann; Norbert Wittig, all of Arnsberg, Fed. Rep. of Germany

[73] Assignee: Trilux-Lenze GmbH & Co. KG, Arnsberg, Fed. Rep. of Germany

[21] Appl. No.: 186,601

[22] Filed: Apr. 27, 1988

[30] Foreign Application Priority Data

Jun. 26, 1987 [DE] Fed. Rep. of Germany ....... 3721075

[51] Int. Cl.$^4$ ................................................ G05F 1/46
[52] U.S. Cl. ..................................... 323/271; 323/222; 323/285; 363/89
[58] Field of Search ..................... 363/63, 89; 323/222, 323/268, 271, 282, 284, 285

[56] References Cited

U.S. PATENT DOCUMENTS

| | | | |
|---|---|---|---|
| 3,975,672 | 8/1976 | Lachocki | 323/271 |
| 4,626,982 | 12/1986 | Huber | 323/271 |
| 4,695,785 | 9/1987 | Mieth et al. | 323/222 |

*Primary Examiner*—Peter S. Wong
*Attorney, Agent, or Firm*—Spensley Horn Jubas & Lubitz

[57] ABSTRACT

A d.c. supply circuit containing a series-circuit composed of a switch and an inductor. A regulator circuit is provided to alternatingly drive the switch into conductive and nonconductive states. The control is performed by the inductor and responsive to current ($i_L$).

The series-circuit also includes an auxiliary switch, to which is connected, in parallel, a series-circuit formed by a diode and a capacitor. In short periods, in which the switch is conductive while the auxiliary switch is nonconductive, the capacitor is charged in order to generate the supply voltage for the regulator circuit.

5 Claims, 1 Drawing Sheet

D.C. VOLTAGE SUPPLY CIRCUIT

BACKGROUND OF THE INVENTION

1. Field of the Invention

The invention relates to a d.c. voltage supply circuit.

2. Description of the Related Art

There have been known d.c. voltage supply circuits comprising switch-mode power supply units which contain a series-circuit connected to the supply voltage and consisting of a switch and an inductor. The switch is controlled to alternatingly become conductive or nonconductive in order to charge the inductor in the conductive phase. In the nonconductive phase of the switch, the inductor is discharged to the load. The control of the switch is performed via a regulator circuit responsive to a current or voltage value of the series circuit. Switch-mode power supply units are advantageous because only relatively low inductances are required for generating d.c. voltage, and d.c. voltages higher than the supply voltage may be also produced.

Two types of switch-mode power supply units may be distinguished, namely the forward converter and the flyback converter, neither of which is well-suited to generate an auxiliary voltage for powering the regulator circuit. Basically, the auxiliary voltage may be obtained from the generated d.c. voltage. However, as a rule, the auxiliary voltage is much lower than the generated d.c. voltage. If the auxiliary voltage is obtained from the d.c. voltage by a voltage divider, this would entail high power losses, particularly if the d.c. voltage supply circuit is capable of generating voltages of different values. In place of a voltage divider, use could be made of a constant current source to generate at a resistor a defined voltage drop which may be used as an auxiliary voltage. In the case of such a circuit, although losses would be independent from the level of the generated d.c. voltage, a high expenditure would be required and the power dissipation would be still considerable.

SUMMARY OF THE INVENTION

It is an object of the invention to provide a d.c. voltage supply circuit including a switch-mode power supply unit in which the auxiliary voltage for powering the regulator circuit may be simply obtained at low expenditure and with substantially no power loss.

In the case of a d.c. voltage supply circuit provided according to a preferred embodiment of the invention, the series circuit, composed of the switch and the inductor, additionally includes an auxiliary switch which is also controlled by the regulator circuit and which is generally always conductive when the switch is conductive and which is generally always nonconductive when the switch is nonconductive. Basically, the auxiliary switch is controlled in the same way as the switch, thus maintaining the function of the series-circuit for charging and discharging the inductor. Both switches are basically controlled synchronously, with the exception that in times in which the switch is conductive, the auxiliary switch is shortly driven into the nonconductive state or maintained in the nonconductive state in order to charge the capacitor via the diode. During a short period at the end of the conductive state of the switch, the auxiliary switch is turned into the nonconductive state, whereby the capacitor is charged and the supply voltage for the regulator circuit is regenerated to reach its desired value. During the subsequent control operations, the capacitor is discharged to the extent that current is used up by the regulator voltage. Hence, the capacitor voltage slowly decreases to be regenerated again with the next refreshment.

The switches are preferably switchable between the conductive and nonconductive states within microseconds. The time periods during which the switch is conductive while the auxiliary switch is nonconductive are preferably on the order of nanoseconds. Hence, the on-times and the off-times of the switch are substantially longer than the charging times of the capacitor, typically differing by a factor between ten and one hundred.

The regulator circuit for performing the control operations of the flyback converter is not yet operative when the d.c. voltage supply circuit is turned on because, at that moment, the auxiliary voltage is not yet built up. In one embodiment the auxiliary voltage may be generated in this state by setting the switch such that an auxiliary current flows therethrough if supply voltage is present while the regulator circuit is not yet powered and the switch is not yet controlled.

Preferably, the switch and the auxiliary switch are electronic, but, basically, mechanical switches may be used as well. If electronic switches are used, such as transistors, the circuit for generating the auxiliary current may consist of a resistor interconnecting the collector and base of the transistor. As soon as the input voltage is applied, the transistor is driven into the active region, and the auxiliary current may flow. By this means, the auxiliary voltage is built up at the capacitor whereby the regulator circuit becomes operative.

The control of the auxiliary switch is relatively simple. Basically, the auxiliary switch and the switch are operated by the control unit in the same way, but with a slight difference in time. If the switching states of auxiliary switch precede shortly those of the switch, each conductive phase of the auxiliary switch is followed by a short period in which the switch is still conductive and in which the capacitor is charged.

It is an advantage of the invention that a transistor used as the auxiliary switch only has to switch a very low power and is also exposed to low voltages. In other words, a customary transistor with a low switching power may be used. On the other hand, the transistor used as the switch responsible for the switching performance is preferably dimensioned for higher power requirements.

The invention may be used with flyback and forward converters.

BRIEF DESCRIPTION OF THE DRAWINGS

A detailed description of a preferred embodiment of the invention will be made with reference to the accompanying drawings.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
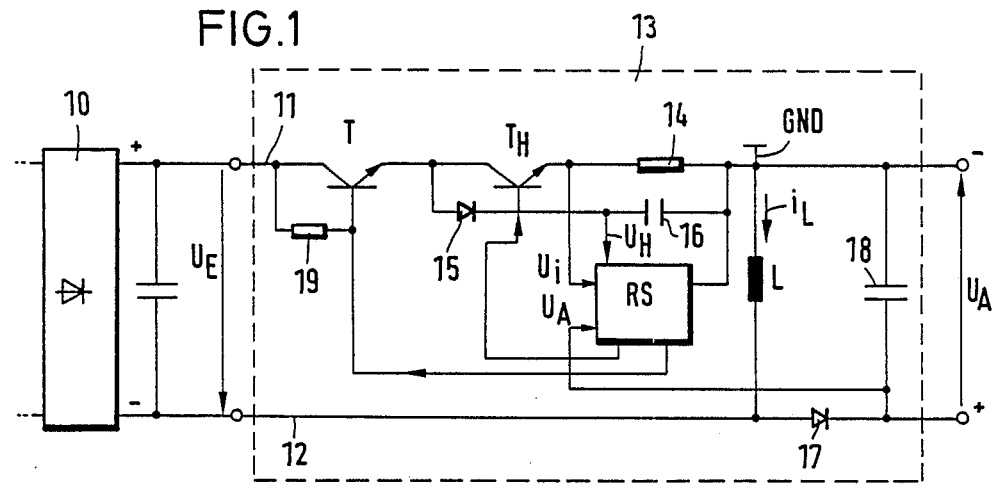
FIG. 1 shows a schematic wiring diagram of a d.c. voltage supply circuit.

FIG. 1 shows a rectifying circuit 10 designed as a double-way rectifier whose input is connected via a (non-illustrated) high frequency filter to a power network voltage of, for example, 220V and 50 Hz. At the output of the rectifying circuit 10, the supply voltage $U_E$ is produced in the form of a rectified a.c. voltage, which is supplied to the two input lines 11 and 12 of the switch-mode power supply unit 13, which is designed as a flyback converter. One input line 11 contains a series connection comprising an electronic switch T; e.g., a transistor, an electronic auxiliary switch $T_H$; e.g., a transistor, and a low-ohmic current measuring resistor 14. One leg of the current measuring resistor 14 is connected to ground potential GND. Between ground potential GND and input line 12, there is provided the inductor (coil) L which, by this means, forms with switch T, auxiliary switch $T_H$ and current measuring resistor 14 a series connection present at the supply voltage $U_E$.

At the line 12 connected to the minus pole of the supply voltage, there is connected via the diode 17 the plus pole of the capacitor 18 whose minus pole is connected to the ground potential GND. The output voltage $U_A$, viz. the d.c. current to be generated, is formed at the capacitor 18.

Due to the switching regulator shown in FIG. 1, a pole reversal between voltage $U_E$ and $U_A$ is realized, in other words, the polarity of the output voltage $U_A$ is reverse to that of the input voltage $U_E$.

When switches T and $T_H$ are conductive, the inductor L is charged through the measuring resistor 14 and the rectifier 10, with a nearly linear rise of coil current $i_L$. If both switches T and $T_H$ become nonconductive, the inductor L tries to maintain the coil current. This being possible only by a current flow through the series-circuit formed by capacitor 18 and diode 17, the coil current will flow onto the capacitor 1, which is charged accordingly.

The flyback converter 13 comprises a regulator circuit RS connected to the ground potential as a reference potential. One input of the regulator circuit RS is provided with the current-dependent voltage $U_i$ at the measuring resistor 14, while the output voltage $U_A$ is fed to the other input of the regulator circuit. The potentials present at the inputs of the regulator circuit RS are representative of the voltages with respect to the ground potential GND. In a manner still to be explained hereunder, the regulator circuit RS controls switch T and auxiliary switch $T_H$.

Parallel to the series-circuit formed by the auxiliary switch $T_H$ and the low-ohmic measuring resistor 14, there is connected a series-circuit consisting of a diode 15 and a capacitor 16. At the connecting point of diode 15 and capacitor 16, there is produced the auxiliary voltage $U_H$, which is fed as supply voltage to the regulator circuit RS. One leg of the capacitor 16 is connected to the ground potential. In the preferred embodiment switch T is an npn-transistor whose emitter is connected to the collector of transistor $T_H$, while the collector of transistor T is connected to the input line 11 from which a resistor 19 extends to the base of transistor T. The bases of both transistors T and $T_H$ are controlled by the regulator circuit RS.

Figure 2:
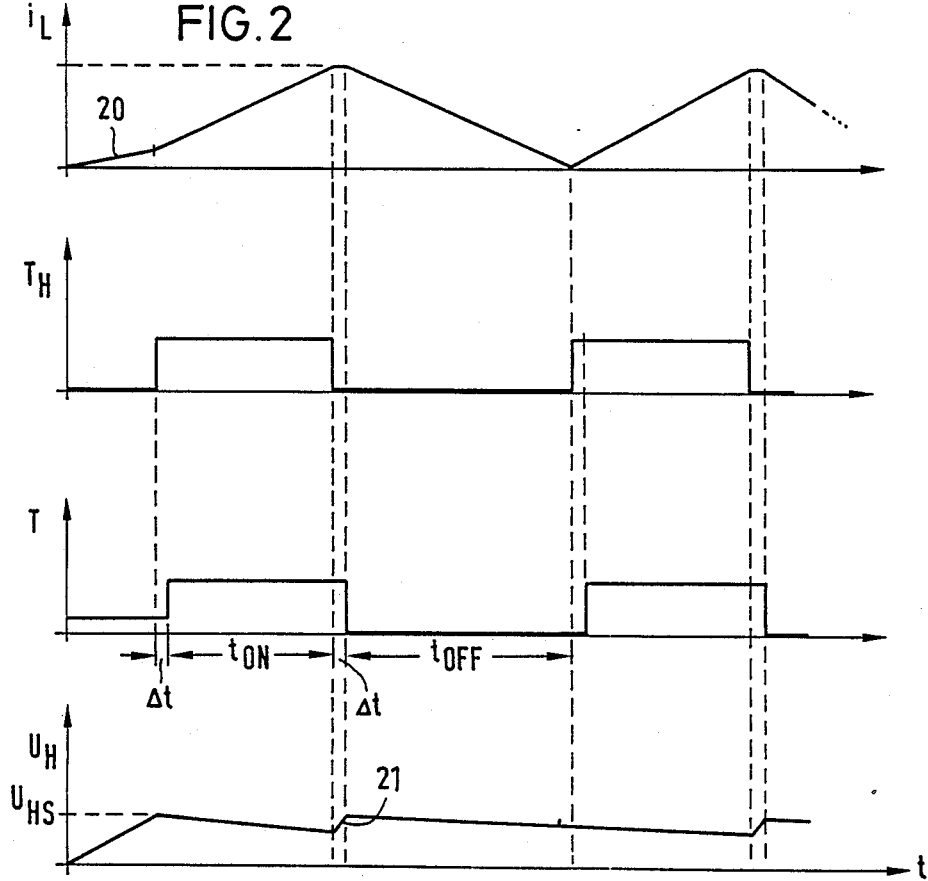
FIG. 2 shows a schematic view of various curves of switching states in connection with a d.c. voltage supply circuit according to FIG. 1.

FIG. 2 schematically shows the switching conditions of the circuit of FIG. 1. $i_L$ shows the variation in time of the current flowing through inductor L. Moreover, the switching conditions of transistors $T_H$ and T are illustrated, wherein a pulse means that the respective transistor is conductive while a pulse gap shows that the transistor is blocked. $U_H$ shows the variation of time of the auxiliary voltage produced at capacitor 16.

If the circuit is put into operation, both transistors are blocked, while the regulator RS is not yet provided with voltage. Supply voltage $U_E$ reaches the base of transistor T through resistor 19. A current flows through the base-emitter diode of transistor T while it is driven into the active region and an auxiliary current may flow via diode 15 and capacitor 16. At the same time, said current flows through inductor L to line 12. Said charging current of the capacitor 16 is designated by the number 20 in FIG. 2.

As soon as voltage $U_H$ at the capacitor 16 has reached the desired value $U_{HS}$ of, for example, 12V, the regulator circuit RS becomes operative. Both transistors T and $T_H$ are controlled by it generally synchronously, however, the control of $T_H$ precedes that of T by a slight time difference t of some nanoseconds. In other words, $T_H$ becomes conductive first, and, shortly thereafter, T will be also conductive. The time in which both transistors are in the conductive state is designated as $t_{ON}$, said time being constant. The off-time $t_{OFF}$ in which both transistors are blocked depends upon the course of the coil current $i_L$, said time being terminated if the coil current becomes zero, and this is determined by voltage $U_i$.

In the conductive time $t_{ON}$, there is a nearly linear rise of the coil current $i_L$. Upon termination of $t_{ON}$, $T_H$ is first switched into the blocking state. During the time t, the capacitor 16, previously partly discharged by the current consumption of the regulator circuit RS, is charged again. This is marked by the number 21 in FIG. 2. Due to the regulator circuit, the auxiliary voltage $U_H$ is limited to the desired value $U_{HS}$. At the end of the time t, the transistor T is also blocked. There follows the off-time $t_{OFF}$ in which inductor L is discharged onto the capacitor 18 while the coil current $i_L$ drops linearly. If the coil current drops to zero, the regulator circuit RS first turns on the transistor $T_H$. Since the transistor T is still blocked, the capacitor 16 may not yet be charged. Hence, the auxiliary voltage $U_H$ drops beyond an off-time $t_{OFF}$ and an on-time $t_{ON}$ in order to rise again, prior to the beginning of the next on-time, to the desired value $U_{HS}$.

The duration of the on-time $t_{ON}$ is predetermined by the regulator circuit RS responsive to the desired output voltage $U_A$. If it is intended to increase the output voltage, $t_{ON}$ will be extended. To permit a control of the output voltage, the actual value of the output voltage is supplied to the regulator circuit.

As an alternative to the disclosed embodiment, the control may be performed such that the capacitor 16 is not only charged prior to each off-time $t_{OFF}$, but also, additionally, prior to each on-time $t_{ON}$. To this effect, the transistor $T_H$ is to be still kept nonconductive for a short time, after the transistor T has been switched into the conductive state.

Moreover, it is also possible to allow the switching states of the transistor T to precede those of the transistor $T_H$.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A voltage supply circuit including a switch-mode power supply unit for generating a d.c. voltage of constant amplitude from a supply voltage, comprising:
   a first series circuit connected to the supply voltage, the first series circuit including an inductor, a first switch and a second switch,
   detection means for detecting a current or voltage in the first series circuit and for generating a signal in response thereto,
   a regulator circuit, responsive to the signal generated by the detection means, for switching the first switch between conductive and nonconductive states and for switching the second switch between conductive and nonconductive states,
   a second series circuit connected in parallel to the second switch, the second series circuit including a diode and a capacitor,
   means for drawing from the capacitor an auxiliary voltage and for supplying the auxiliary voltage as a supply voltage to the regulator circuit,
   means for maintaining the second switch in the nonconductive state for a portion of the time during which the first switch is in the conductive state, whereby the capacitor is charged up to the auxiliary voltage.

2. A voltage supply circuit as defined in claim 1, wherein the regulator circuit further comprises means for limiting the auxiliary voltage to a predetermined value.

3. A voltage supply circuit as defined in claim 1, wherein the first switch is positioned between a pole of the supply voltage and the second switch is connected such that, upon applying the supply voltage, an auxiliary current flows through the diode to the capacitor if the regulator circuit is not yet operative, whereby an auxiliary current flows through the first switch when the supply voltage is present.

4. A voltage supply circuit as defined in claim 1, further comprising:
   means for establishing a period of time during which the second switch is conductive and the first switch is not conductive.

5. A voltage supply circuit as defined in claim 1, further comprising:
   means for establishing a period of time during which the first switch is conductive and the second switch is not conductive.

* * * * *